USO10554620B2

(12) United States Patent
Chang et al.

(10) Patent No.: US 10,554,620 B2
(45) Date of Patent: Feb. 4, 2020

(54) DEFAULT GATEWAY EXTENSION (71) Applicant: Cisco Technology, Inc., San Jose, CA (US)

(72) Inventors: David W. Chang, Milpitas, CA (US); Abhijit Patra, Santa Clara, CA (US); Nagaraj Bagepalli, San Jose, CA (US); Dileep Kumar Devireddy, San Jose, CA (US); Ganesh Sadasivan, Sunnyvale, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 551 days.

(21) Appl. No.: 14/749,391

(22) Filed: Jun. 24, 2015

(65) Prior Publication Data
US 2016/0352682 A1 Dec. 1, 2016

Related U.S. Application Data (60) Provisional application No. 62/168,105, filed on May 29, 2015.

(51) Int. Cl.
G06F 15/16 (2006.01)
H04L 29/12 (2006.01)
H04L 29/08 (2006.01)
H04L 12/911 (2013.01)

(52) U.S. Cl.
CPC ........ H04L 61/6022 (2013.01); H04L 61/103 (2013.01); H04L 67/10 (2013.01); H04L 47/825 (2013.01)

(58) Field of Classification Search
CPC . H04L 61/6022; H04L 12/4633; H04L 45/66; H04L 47/825; G06F 9/4416; G06F 9/45558
USPC ......................................... 709/245, 201, 203
See application file for complete search history.

(56) References Cited

U.S. PATENT DOCUMENTS

| 10,148,735 | B1* | 12/2018 | Kolam | ..................... H04L 67/10 |
| 2009/0210518 | A1* | 8/2009 | Verma | ................ H04L 29/12028 709/220 |
| 2012/0266062 | A1* | 10/2012 | Zhao | .................. G06F 17/30899 715/234 |
| 2013/0266019 | A1* | 10/2013 | Qu | .......................... H04L 45/74 370/395.53 |

(Continued)

OTHER PUBLICATIONS

International Search Report and Written Opinion dated Sep. 7, 2016 for corresponding PCT application No. PCT/US2016/034720.

(Continued)

Primary Examiner — Liang Che A Wang
Assistant Examiner — Kaylee J Huang
(74) Attorney, Agent, or Firm — Polsinelli PC (57) ABSTRACT Many hybrid cloud topologies require virtual machines in a public cloud to use a router in a private cloud, even when the virtual machine is transmitting to another virtual machine in the public cloud. Routing data through an enterprise router on the private cloud via the internet is generally inefficient. This problem can be overcome by placing a router within the public cloud that mirrors much of the routing functionality of the enterprise router. A switch configured to intercept address resolution protocol (ARP) request for the enterprise router's address and fabricate a response using the MAC address of the router in the public cloud.

17 Claims, 7 Drawing Sheets (56) References Cited

U.S. PATENT DOCUMENTS

| | | | | |
|---|---|---|---|---|
| 2013/0283364 A1* | 10/2013 | Chang | .................... | H04L 49/70 |
| | | | | 726/12 |
| 2014/0334495 A1* | 11/2014 | Stubberfield | ......... | H04L 49/354 |
| | | | | 370/401 |
| 2015/0096011 A1 | 4/2015 | Watt | | |
| 2016/0085560 A1* | 3/2016 | Gourlay | ................ | G06F 9/4416 |
| | | | | 713/2 |
| 2016/0337236 A1* | 11/2016 | Hsu | ........................ | H04L 45/64 |

OTHER PUBLICATIONS

Anonymous, "Deploying a Secure Hybrid Cloud Extension with Cisco CSR 1000V and LISP—White Paper", Oct. 30, 2014, http://www.cisco.com/c/en/us/products/collateral/routers/cloud-services-router-1000v-series/white-paper-c11-731872.pdf.

Xu, Huawei et al., "Virtual Subnet: A L3VPN-based Subnet Extension Solution;draft-ietf-l3vpn-virtual-subnet-03.txt", Internet Engineering Task Force, IETF; StandardWorkingDraft, Internet Society (ISOC) 4, Rue Des Falaises CH—1205 Geneva, Switzerland, Dec. 3, 2014.

* cited by examiner

DEFAULT GATEWAY EXTENSION

RELATED APPLICATIONS

This application claims priority to U.S. Provisional Application No. 62/168,105, entitled "DEFAULT GATEWAY EXTENSION," filed May 29, 2015, which is incorporated herein by reference in its entirety.

TECHNICAL FIELD

The present technology pertains to managing connections between virtual machines and routers within a hybrid cloud environment and more specifically pertains to intercepting ARP requests directed to one router and fabricating a response containing the MAC address of another router.

BACKGROUND

A "hybrid cloud" is a cloud infrastructure composed of two or more clouds that inter-operate or federate. A hybrid cloud can be an interaction between private and public clouds where a private cloud connects to a public cloud and utilizes public cloud resources in a secure and scalable way. The hybrid cloud model provides key advantages over others cloud models. For example, the hybrid cloud model allows enterprises to protect their existing investment; maintain control of their sensitive data and applications; and maintain control of their network, computing, and storage resources. Additionally, hybrid clouds allow enterprises to scale their environment on demand.

While many applications are suited for corporate datacenters, there are others whose dynamic compute requirements make them appropriate for cloud-based deployment. For such applications, the challenge is to take advantage of the computing elasticity and economics of cloud computing without sacrificing the security that the information assets (e.g., databases, directories, repositories) gain from being located on-premises within the business' datacenters. To be a viable hybrid cloud solution, data must be kept secure, applications need not be re-architected, and clouds should be readily mobile.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

In many hybrid cloud topologies, virtual machines in a public cloud were traditionally required to use a router located in a private cloud even when both the sending and receiving virtual machines are located in the public cloud. For example, most workloads in an enterprise (i.e., private cloud) are assigned a default gateway configuration. If these workloads are migrated to public cloud without any additional configuration, the workload would still use the default gateway located at the enterprise. Routing data through an enterprise router on the private cloud is generally inefficient when the data to and from the router must go over the internet. This problem can be overcome by placing a router on the public cloud that replicates much of the routing functionality of the enterprise router. A switch located in the public cloud can be configured to intercept an address resolution protocol (ARP) request for resolving the enterprise router's media access control (MAC) address and fabricate a response containing the MAC address of the router in the public cloud.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for provisioning a router in a public cloud that can replicate some functionality of an enterprise router located on an enterprise network.

Cloud computing can be generally defined as Internet-based computing in which computing resources are dynamically provisioned and allocated to client or user computers or other devices on-demand from a collection of resources available via the network (e.g., "the cloud"). Cloud computing resources can include any type of resource such as computing, storage, network devices, virtual machines (VMs), etc. For example, cloud computing resources may include service devices (firewalls, deep packet inspectors, traffic monitors, etc.), processing devices (brute force processing capability), storage devices (e.g., servers, network attached storages, storage area network devices), etc., and may be used for instantiation of VMs, databases, applications (Apps), etc.

As noted above, a "hybrid cloud" is a cloud infrastructure composed of two or more clouds that inter-operate or federate. A hybrid cloud can be an interaction between private and public clouds where a private cloud joins a public cloud and utilizes public cloud resources in a secure and scalable way. While many applications could remain within corporate datacenters, there are other applications whose dynamic compute requirements make them good candidates for the cloud. For such applications, the challenge is to take advantage of the computing elasticity and economics of cloud computing without sacrificing the security that the information assets (e.g., database, directories, repositories) gain from being located on-premises within the business' datacenters. To be a viable hybrid cloud solution, data must be kept secure, applications need not be re-architected, and clouds should be readily mobile.

Figure 1:
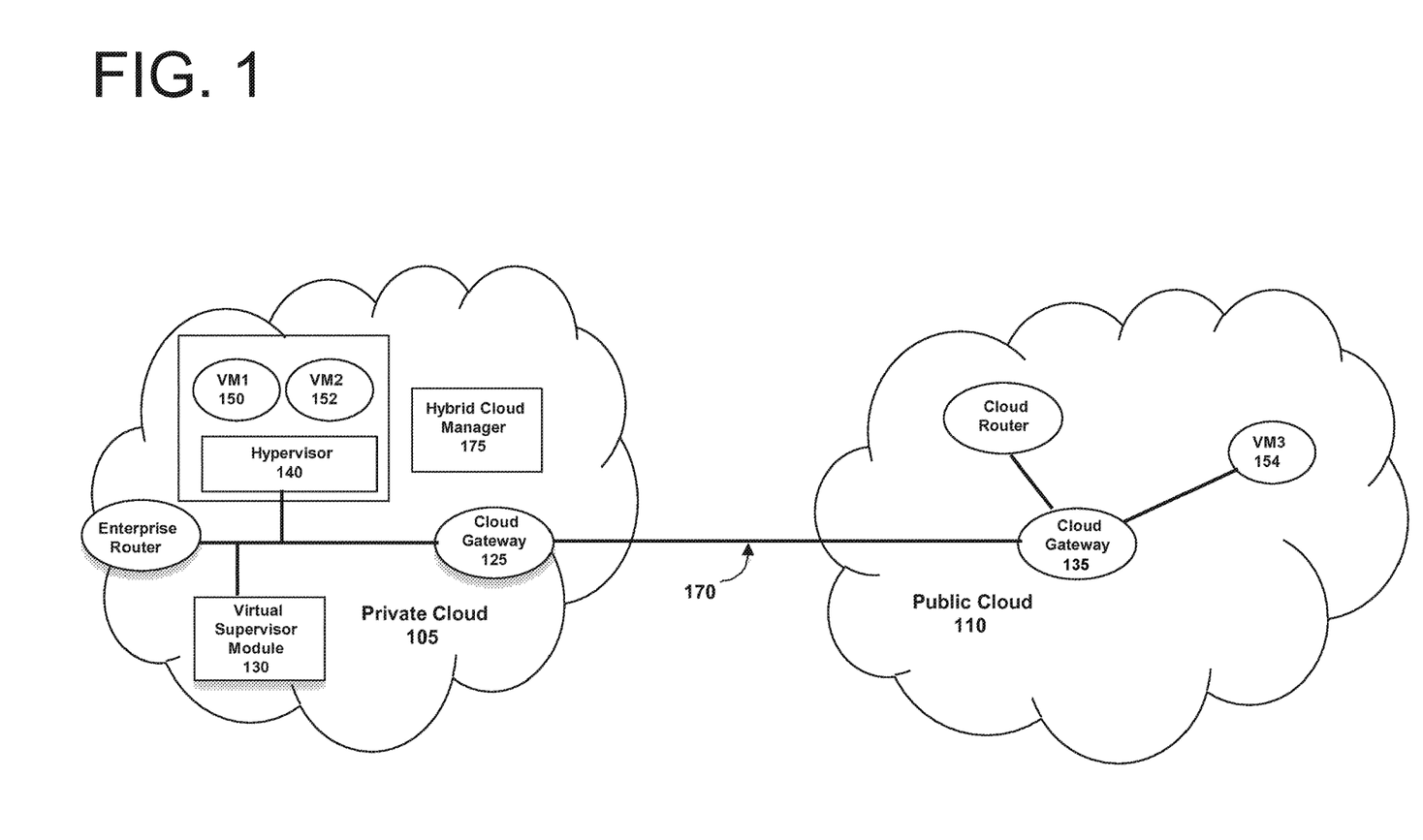
FIG. 1 illustrates an example hybrid cloud architecture.

FIG. 1 illustrates an example hybrid cloud network illustratively comprising a plurality of networks or "clouds," including a private cloud 105 (e.g., enterprise datacenters) and a public cloud 110 separated by a public network, such as the Internet (not shown). Although current terminology refers to a hybrid cloud comprising a private cloud and a public cloud, it should be understood that many aspects of this disclosure can be practiced in various multi-cloud configurations (e.g., two clouds hosted by third party providers or two enterprise clouds located in different locations). The private cloud 105 and public cloud 110 can be connected via a communication link 170 between cloud gateway 125 and cloud gateway 135. Data packets and traffic can be exchanged among the devices of the hybrid cloud network using predefined network communication protocols as will be understood by those skilled in the art.

As depicted in FIG. 1, each cloud network element can have a cloud gateway 125 at the private cloud 105, a cloud gateway 135 at the public cloud 110, and at least one virtual machine (VM). For example, FIG. 1 illustrates VM1 150, VM2 152, at the private cloud 105, and VM3 154 (or nested VM containers) within the public cloud. The cloud gateway 125 at the private cloud can be configured as a VM running in the private cloud (enterprise datacenter) that is responsible to establish a communication link 170 for interconnecting the components in the public cloud with the private cloud. The cloud gateway 135 at the public cloud may be configured as a VM running in the public cloud that is responsible to establish the communication link 170 for connecting the cloud gateway 135 with cloud resources.

FIG. 1 also illustrates a hybrid cloud manager 175 within the private cloud 105 which can be a management plane VM for auto-provisioning resources within the hybrid cloud solution. Specifically, the hybrid cloud manager 175 is a management platform (which could be a VM) running in the private network, and may be generally responsible for providing the hybrid cloud operations, translating between private cloud and public cloud interfaces, management of cloud resources, dynamic instantiating of cloud gateways and cloud VMs components (VM3 154 in the public cloud 110) though the private virtualization platform and public cloud provider APIs. It may also health-monitor all the components (e.g., the cloud gateways, the one or more private application VMs, and the communication link 170 and provides high availability of those components).

FIG. 1 also illustrates a virtual supervisor module 130 (for example, the Nexus 1000V Switch by Cisco Systems, Inc.), a hypervisor 140 (also called a virtual machine manager) and one or more VM 150, 152. The virtual supervisor module 130 in the private cloud can be used to create VMs in the public or private cloud, such as VM1 150, VM2 152, and VM3 154. Each VM hosts a private application, even VM3 154 in the public cloud hosts a private application, and it is as though VM3 154 in the public cloud were within the private cloud. The hypervisor 140 can be configured by the virtual supervisor model 130, and provides an operating system for one or more VMs.

As introduced above, FIG. 1 also illustrates communication link 170. Communication link can take several forms include a type of VPN, or a tunnel. Specifically, some hybrid cloud technologies utilize an open virtual private network (VPN) overlay or else an IP security (IPSec) VPN based L3 network extension to provide communication link 170. While offering secure transport connections in a cloud environment, VPN does not provide a switch infrastructure for providing features such as switching network traffic locally at the cloud, providing consistent enterprise network polices, allowing insertion of various network services (e.g., load balancers, firewalls, etc.), and construction of a sophisticated network topology (e.g., the current systems are connected through a router and multiple VLANs). While IPsec-VPN-based technology can provide customers inter-datacenter network connectivity and relatively sophisticated network topologies, it can only extend the enterprise network at the network layer (Layer 3 or "L3" of the illustrative and well-known OSI model). This implies that the overlay networks created at the cloud datacenter (public cloud 110) must be a set of new subnets, where VMs in the public cloud are assigned with new network identities (e.g., IP and MAC addresses). Because of this, many of enterprise infrastructures (e.g., access control lists, firewall policies, domain name services, etc.) must be modified in order for the newly attached VM systems to be able to work with rest of the enterprise systems. Even the IPSec VPN tunnel would cause problems in penetration of corporate firewalls and Network Address Translation (NAT) devices deep within the enterprise datacenter (private cloud 105).

Some hybrid cloud technologies, such as the presently described technology, utilize a secure transport layer (e.g., Layer 4 or "L4") tunnel as the communication link 170 between a first cloud gateway 125 in a private cloud 105 and a second cloud gateway 135 in a public cloud 110, where the secure transport layer tunnel is configured to provide a link layer (e.g., Layer 2 or "L2") network extension between the private cloud and the public cloud. By establishing a secure transport layer (L4) tunnel 370 (e.g., transport layer security (TLS), datagram TLS (DTLS), secure socket layer (SSL), etc.) over the public network 115, the techniques herein build a secure L2 switch overlay that interconnects cloud resources (public cloud 110) with private clouds 105 (e.g., enterprise network backbones). In other words, the secure transport layer tunnel 370 provides a link layer network extension between the private cloud and the public cloud.

As noted, the cloud gateway 125 deployed at the private cloud 105 can use an L4 Secure Tunnel to connect to the cloud resources allocated at public cloud 110. The L4secure tunnel is well-suited for use with corporate firewalls and NAT devices due to the nature of the transport level protocols (e.g., UDP/TCP) and the transport layer ports opened for HTTP/HTTPS in the firewall. The L2 network is thus further extended and connected to each of the cloud VMs, e.g., VM1 150, VM2 152, VM3 154 through the cloud gateway 135 deployed at the public cloud 110. With an L2 network overlay, all instances of a particular private application VM, e.g, VM3 154 can be seamlessly migrated to the overlay network dynamically created at the public cloud, without any impacts to the existing corporate infrastructure.

As a general practice, a public cloud service provider offers only a limited number of network attachments for each of the cloud VMs, e.g., VM3 154, and network broadcasting capability. This prohibits enterprise customers when migrating their multi-VLAN network architectural environment into the public cloud datacenter. However, building an L2 network overlay on top of L4 tunnels as described herein reduces the network attachments requirements for cloud VMs and provides cloud VMs with network broadcasting ability. The techniques herein thus allow enterprise customers to deploy consistent enterprise-wide network architectures, even in a hybrid cloud environment.

Figure 2:
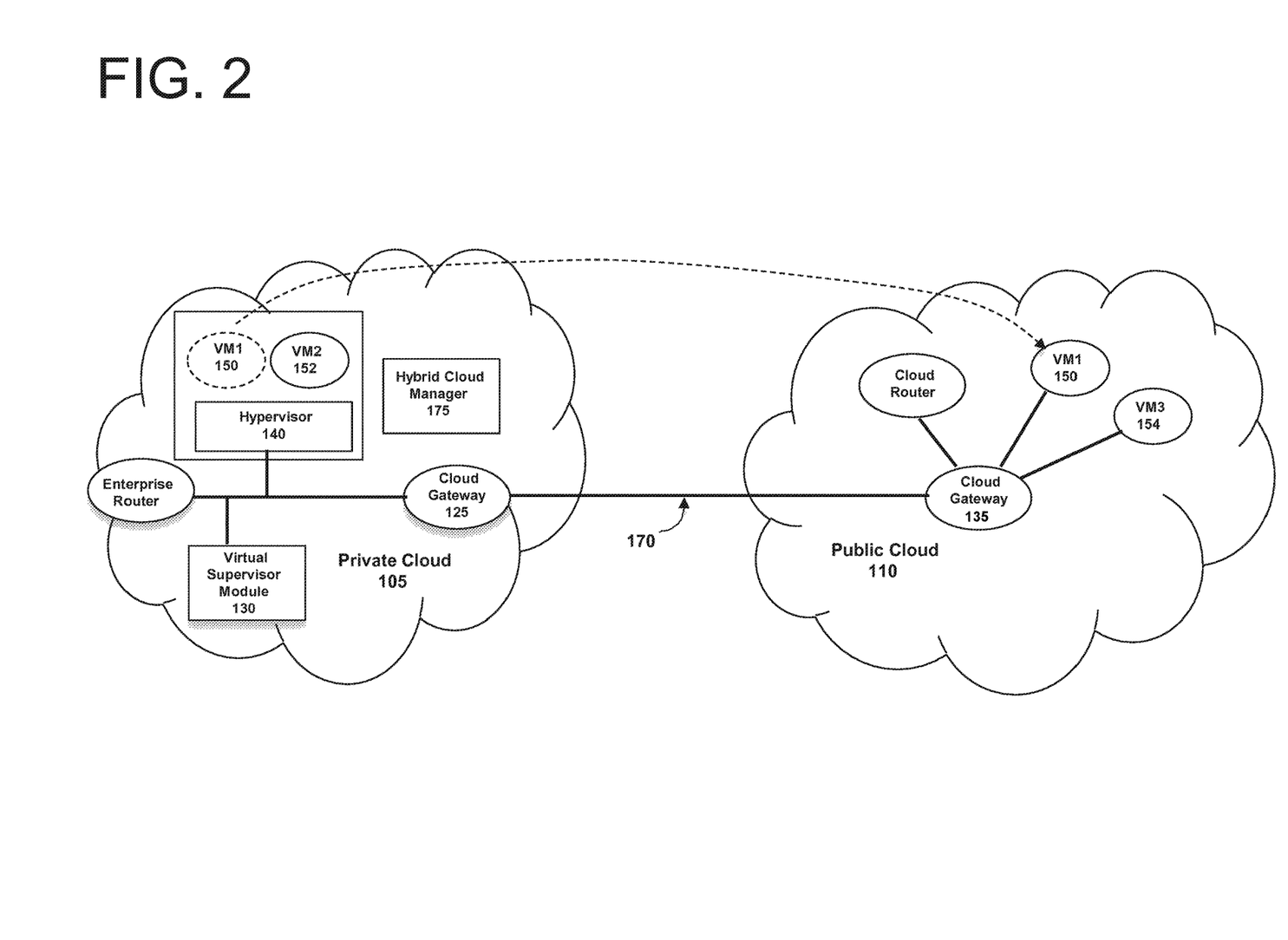
FIG. 2 illustrates an example of migrating a virtual machine in a hybrid cloud architecture.

FIG. 2 illustrates a hybrid cloud environment as illustrated in FIG. 1 being used to migrate a VM from private cloud 105 to public cloud 110. Perhaps a VM on the private cloud needs to be scaled beyond the current resources of the private cloud, or perhaps the private cloud needs to be taken off line for a period of time. In either situation it can be desirable to migrate an application on the private cloud to the public cloud. FIG. 2 illustrates VM1 150 on private cloud 105 being migrated to public cloud 110, where it is illustrated as VM1 $150_1$. Migration is managed using virtual supervisor module 130 to take VM1 150 offline, and migrated using hybrid cloud manager 175 to copy the VM1 150 disk image to public cloud 110, and instantiate it in the public cloud.

Figure 3:
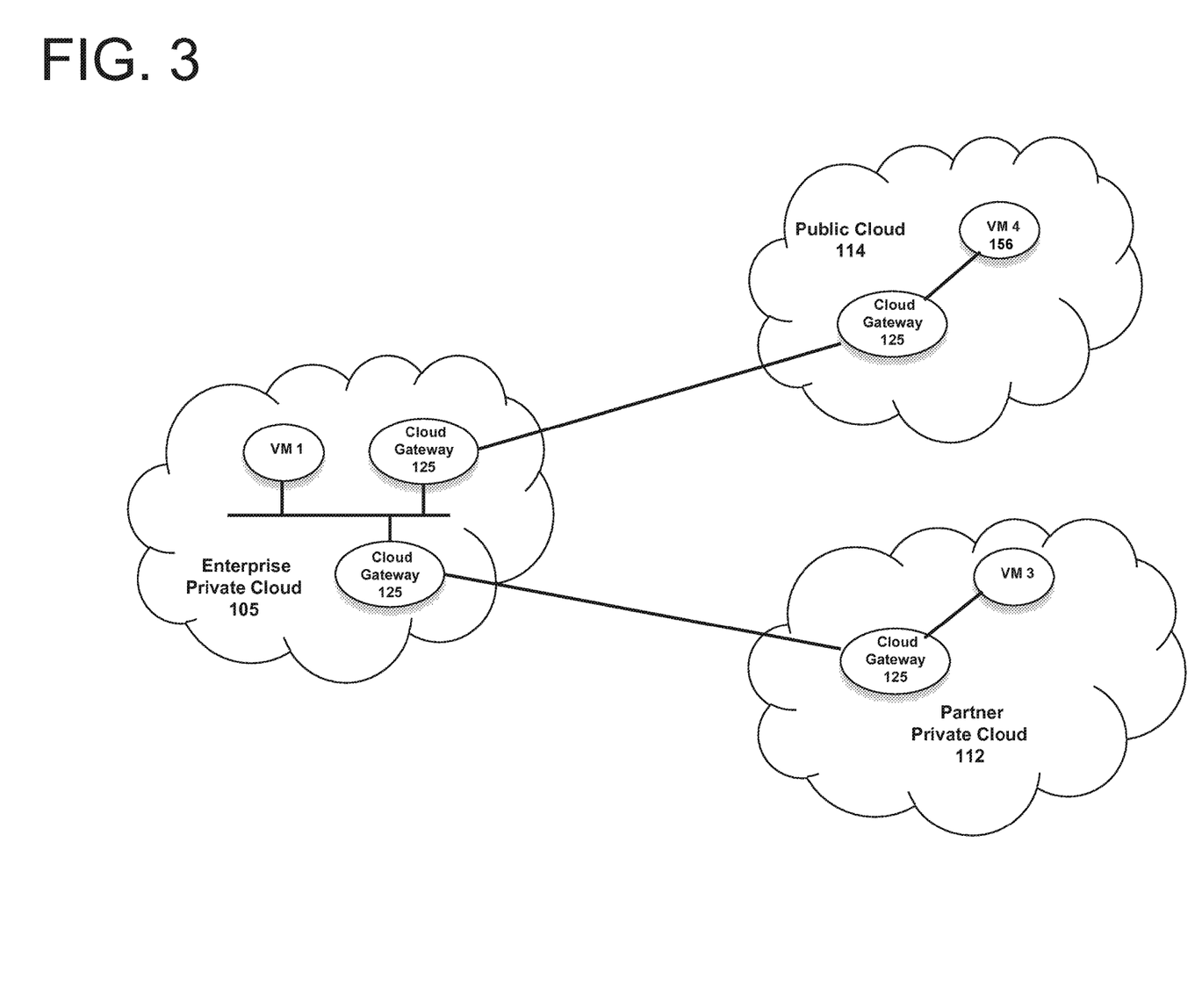
FIG. 3 illustrates an example hybrid cloud wherein one private cloud is in communication with multiple public clouds.

FIG. 3 illustrates an example hybrid cloud environment. In FIG. 3, a public cloud 114 is running an application or service in VM4 156. The application is shared by the enterprise private cloud 105 and partner private cloud 112. In such hybrid cloud environments a public cloud can act as an intermediary that provides limited access to the enterprise and the partner.

Referring again to the discussion of FIG. 1, as addressed above communication link can be Layer 2 Secure Tunnel which can allow switching at the link layer throughout the entire hybrid cloud network. However, such a network configuration is subject to some inefficiencies. For example, traffic sent by the VMs in the public cloud must first come back to enterprise network before it can reach the firewall and router. In order to cope with this problem, the hybrid cloud manager 175 needs to deploy a Firewall and a router in public clouds so the workload traffic can use firewall and routing services directly from public cloud datacenters.

Even with this improvement, administrators would still need to manually replace default gateways configured on workload VMs in the public cloud with a router that is deployed on-demand in the public cloud. And when the workload VM on the public cloud is moved back to the private cloud an administrator would again need to manually reconfigure the gateway address.

Figure 4:
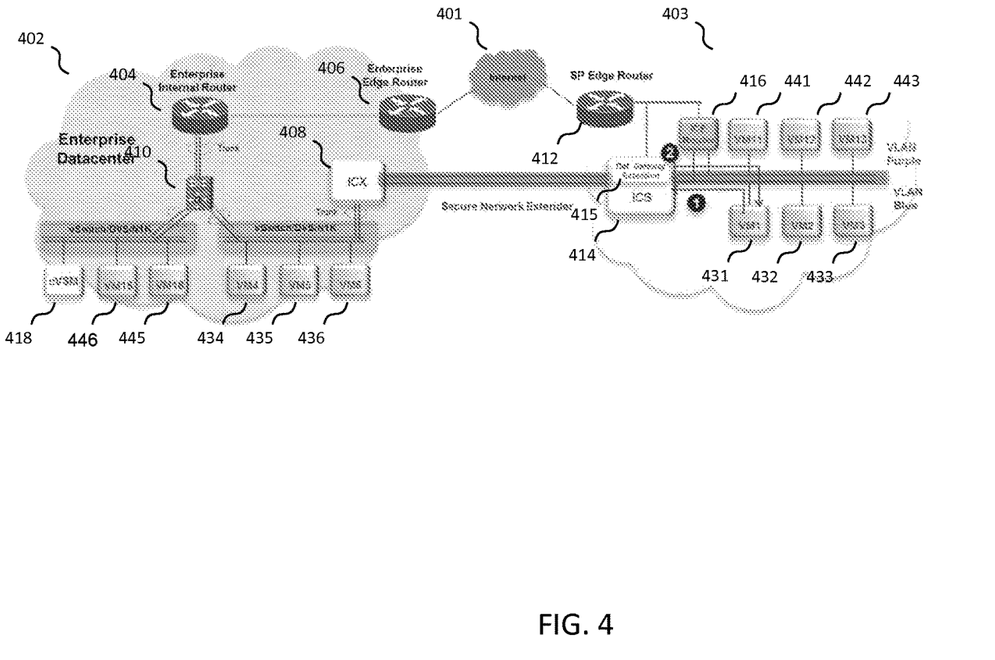
FIG. 4 illustrates an example hybrid cloud supporting link layer communications and default gateway extension.

Such inefficiencies can be overcome using the hybrid cloud illustrated in FIG. 4 which employs a default gateway extension to automatically configure VMs with the appropriate gateway for the hybrid cloud configuration.

As illustrated in FIG. 4, an InterCloud Extender (ICX) 408 can perform functions of a cloud gateway 125 and provide a Layer 2 Secure Extension 170 which stretches enterprise VLAN segments to public cloud with TLS/DTLS overlay tunnels. The overlay tunnel technology allows inter-datacenter network traffic to penetrate through enterprise firewall, web proxy, and NAT devices.

ICX 408 located on private cloud 402 and InterCloud Switch (ICS) 414 located on the public cloud 403 can be responsible for establishing a secure tunnel (L2 network extension) 170 between private cloud 402 and public cloud 403. All inter-VM and provider network access network traffic can be forwarded through ICS 414.

Clouds 402 and 403 can comprise a public cloud, private cloud, enterprise network, "on premises" datacenter, provider network of a third party, etc. Clouds 402 and 403 can join together to form a "hybrid cloud" system. Within a hybrid cloud system, intracloud link speeds are typically significantly faster than intercloud link speeds.

Enterprise router 404 can be located in private cloud 402. Enterprise router 404 can be an enterprise internal router; it can also be termed a private router. InterCloud Fabric (ICF) Router 416 can be located in public cloud 403 and have similar functionality as enterprise router 404. Edge routers 406 and 412 can serve as the interface between their respective clouds and the internet 401.

Some virtual machines (such as 434, 435, 436, 445, 446, and virtual subscriber module 418) can be located on private cloud 402 while others (such as 431, 432, 433, 441, 442, and 443) are located on public cloud 403. In some embodiments, some virtual machines are on a first VLAN (e.g., 431-436) while other virtual machines are on a second VLAN (e.g., 441-445). As depicted, VLANs can span the private cloud 402 and public cloud 403.

A Virtual Supervisor Module (VSM) 418 located on the private cloud 402 can manage ICX 408, ICS 414, and VMs connected to the overlay networks.

The L2 network extension 170 allows VMs migrated to public cloud to preserve their enterprise IP addresses and MAC addresses as well as their network and security (e.g. ACL, Firewall) policies. This can be accomplished by encapsulating L2 data within a secure transport layer (e.g., Layer 4) tunnel that bridges the two clouds. Without such a tunnel, if a VM were migrated, it would need to be reconfigured according to its new location. With this tunnel, the VM can continue normal operation without much additional configuration because L2 data will be forwarded back to the original location.

As aforementioned, all inter-VM and external network access network traffic can be forwarded through ICS 415. The present technology utilizes a Default Gateway Extension Module 415 to have ICS 414 to intercept any ARP request for resolving the MAC address of a given default gateway IP address. ICS 414 can then fabricate an ARP response, which contains ICF router 416's MAC address and send the fabricated response to the requesting VM. ICF router 416 can replicate the enterprise router 404's functionality for all the workload that has been migrated to public cloud; this is possible because enterprise router 404 and ICF router 416 exchange routing information across the secure tunnel 107 using a standard Routing Protocol (e.g. BGP).

When a VM is moved back to private cloud 402, the VM is "cloud migrated;" during the instantiation and reboot of the VM as part of its migration, the VM guest OS needs to do another ARP resolution in order to reach the original default gateway that was configured for the VM (enterprise router 404). In this case, enterprise router 404 answers the ARP request and all further routing and forwarding traffic continues through enterprise router 404.

When ICS 414 detects that ICF router 416 has malfunctioned or is down, default gateway extension function 415 can be disabled and ICS 414 can send a gratuitous ARP reply to refresh the ARP entries in the VMs located on the public cloud 403. This would allow the VMs on the public cloud 403 to send traffic through enterprise router 404 for routing purposes.

In some embodiments, only a portion of the ARP requests are intercepted. For example, security or data auditing requirements might dictate that all traffic from certain virtual machines or protocols be routed through enterprise router 404 while other machines' ARP requests can be intercepted. It should be understood that ARP request intercepting can also be utilized based on load balancing priorities. For example, if the enterprise router 404 or the link between clouds becomes saturated, default gateway extension module 415 can intercept some ARP requests to direct certain VMs to the ICF Router 416. In some embodiments, the default gateway extension module 415 need not wait for an ARP request and can send out a gratuitous ARP to direct traffic appropriately. In order to make this effective, the gratuitous ARP requests are only sent to the ICS network segments located at public clouds.

In some embodiments, a default gateway extension function 415 on an ICS 414 located on a private cloud can activate when the enterprise router 404 malfunctions and send a gratuitous ARP response to VMs on the private cloud directing them to a ICF router 416. Having an ICS 414 thus configured on each cloud in a hybrid cloud setup can create a resilient routing environment. In some embodiments, default gateway extension module 415 sends gratuitous ARP responses to VMs in accordance to load balancing priorities. For example, if private cloud has a first link to a first public cloud and a second link to a second public cloud, half of the gratuitous ARP responses can direct VMs to the ICF router 416 on the first public cloud with the other half going to the second public cloud.

Other multi-router systems can benefit from the principles disclosed herein. For example, a VM located on private cloud 402 may be configured to utilize enterprise router 404 as well as a supplemental router (not depicted); when the VM is migrated to public cloud 403, ICS 414 can intercept ARP requests for enterprise router 404 and/or the supplemental router and fabricate a response to ICF router 416. Further, various VMs from various clouds might be configured to look for IP addresses for various routers; default gateway extension module 415 can intercept ARP requests for these IP addresses and return a fabricated response with the MAC address of the local router.

Figure 5:
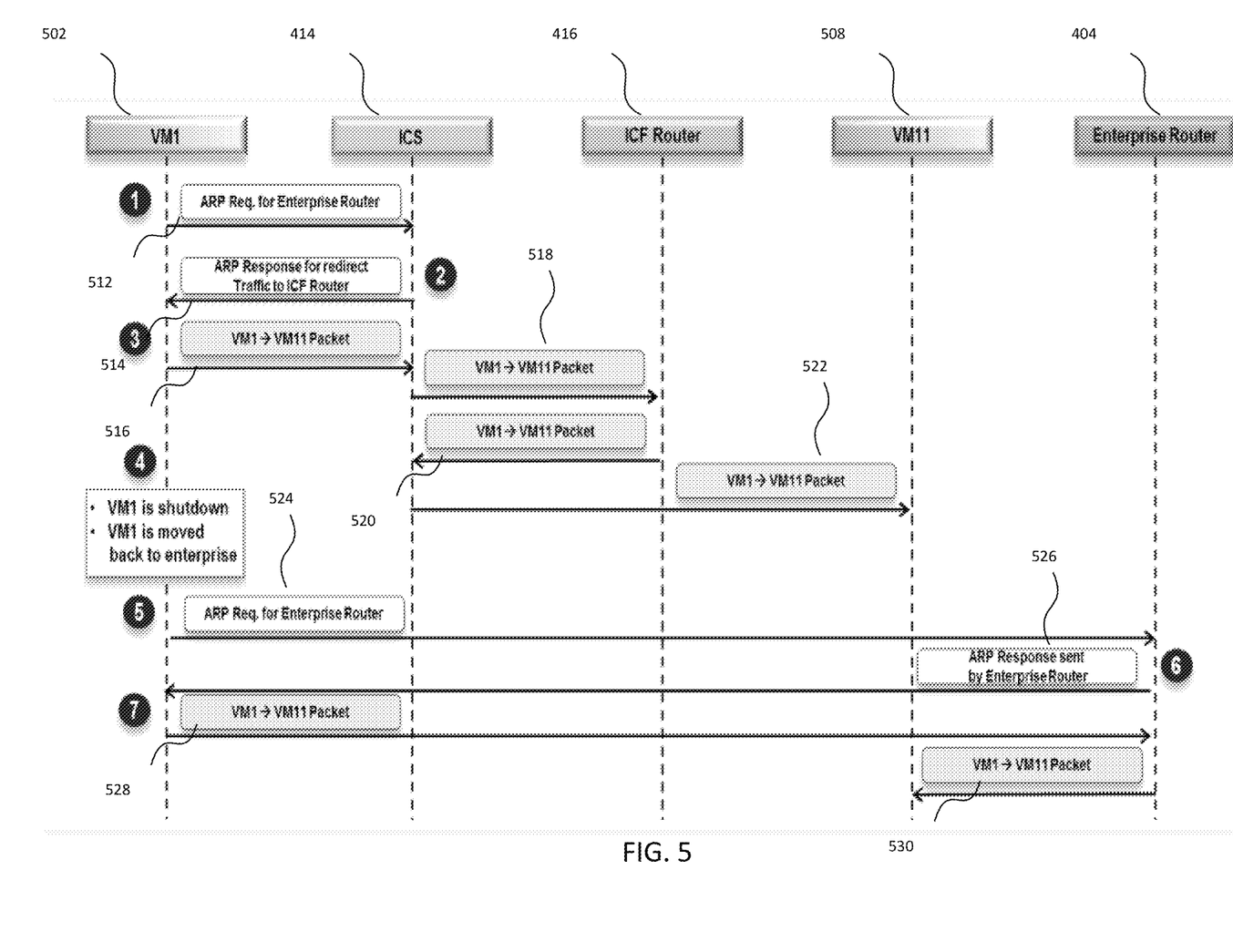
FIG. 5 illustrates an example timing diagram showing communications related to default gateway extension.

FIG. 5 depicts an example sequence of events that can embody the present technology: allowing a first virtual machine 502 (such as VM 431) to communicate with a second virtual machine 508 (such as VM 441) when both virtual machines are located within the public cloud 403 but associated with separate VLANs. Ordinarily, traffic is directed towards enterprise router 404. However, sending packets to private cloud 402 and back to public cloud 403 via internet 401 can be inefficient; the following sequence of events enables first virtual machine 502 to utilize ICF Router 416 and keep the traffic within the public cloud 403. First virtual machine 502 can send an ARP request to ICS 414 pertaining to enterprise router 404 (512). ICS 414 can intercept the ARP request and reply to first virtual machine 502 with a fabricated a response containing the MAC address of ICF router 416 (514). First virtual machine 502 then sends a packet destined for second virtual machine 508 to ICS 414 (516); ICS 414 then forwards the packet to ICF router 416 (518); the packet is then sent to ICS 414 (520) and finally to second virtual machine 508 (522).

If the first virtual machine 502 is shut down and moved ("migrated") to the private cloud 402, it can send a new ARP request for enterprise router 404 (524). Enterprise router 404 can then respond to the ARP request (526). After learning the MAC address of enterprise router 404, first virtual machine 502 can send the packet to enterprise router 404 (528) which gets appropriately forwarded to second virtual machine 508 (530).

Figure 6:
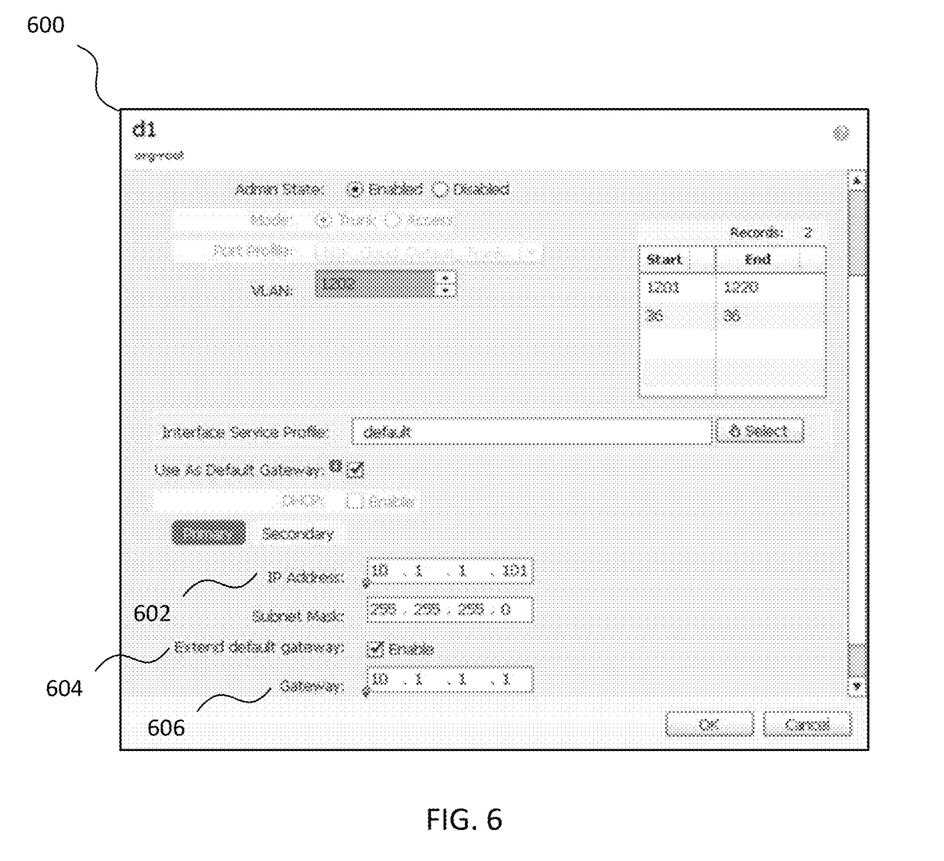
FIG. 6 illustrates an example management interface for enabling default gateway extension.

FIG. 6 illustrates an example default gateway extension module 415 configuration web page 600. The default gateway extension module 415 can be a component within the ICS 414 that can be configured to intercept ARP Requests addressed to enterprise router 404 and fabricate a response containing the MAC address of ICF router 416. Default gateway extension module 415 configuration page 600 can be integrated with the configuration of ICS 414. As depicted in FIG. 6, default gateway extension module 415 configuration page 600 can have a form for entering the IP address of the ICF router 416 (602), a selection to extend enterprise router 404 ("extend default gateway" 604), and a form for entering in the enterprise router 404's IP address ("Gateway" 606).

Figure 7:
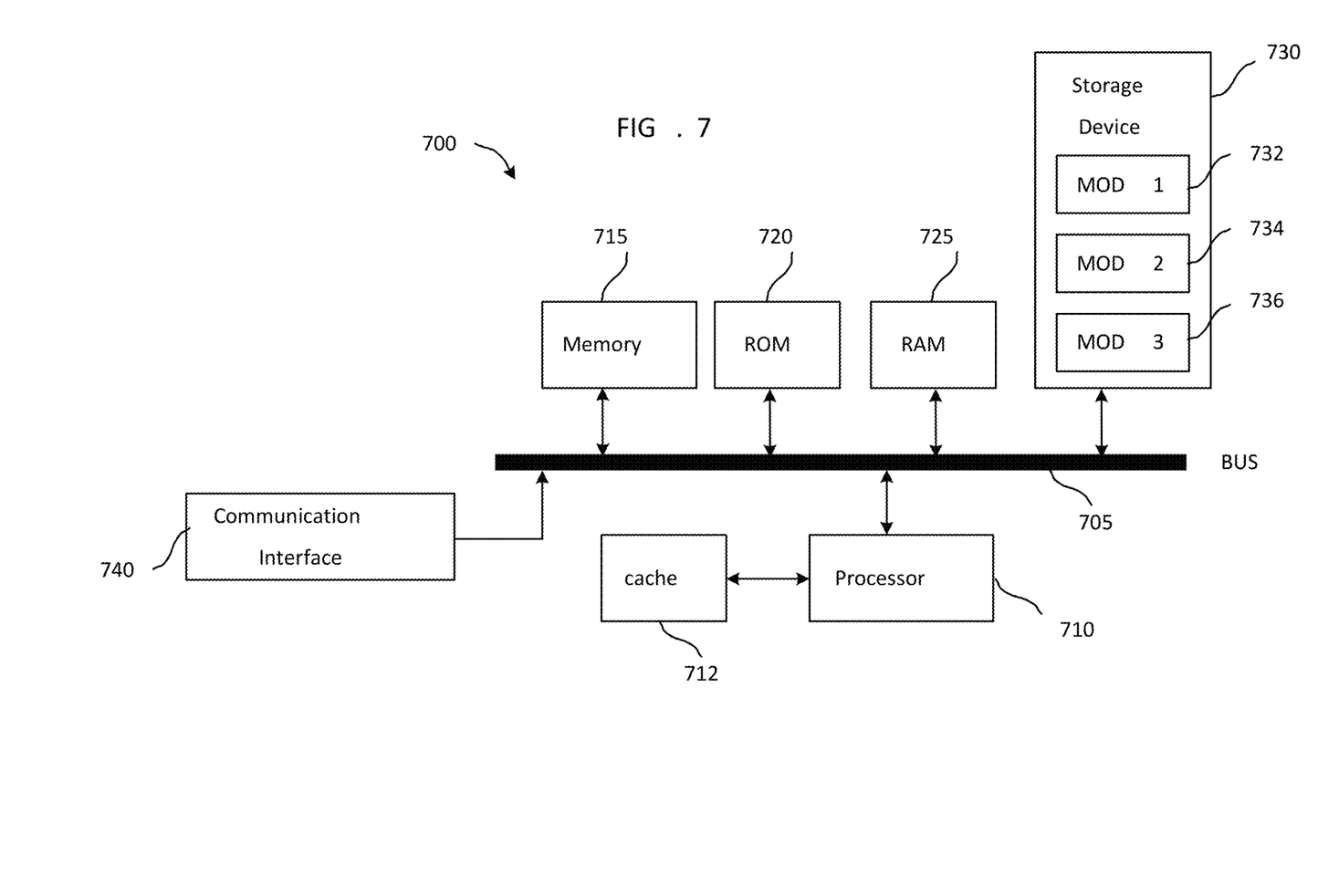
FIG. 7 illustrates an example system embodiment.

FIG. 7 illustrates an example computer system 700 having a chipset architecture that can be used in executing the described method and generating and displaying a graphical user interface (GUI). The computer system 700 is an example of computer hardware, software, and firmware that can be used to implement the disclosed technology. The computer system 700 can include a processor 710 with a cache 712, representative of any number of physically and/or logically distinct resources capable of executing software, firmware, and hardware configured to perform identified computations. The processor 710 can communicate with a chipset with a BUS 705 that can control input to and output from the processor 710. In this example, chipset outputs information to an output, such as a display, and can read and write information to storage device 730, which can include magnetic media, and solid state media, for example. Chipset can also read data from and write data to RAM 725. A bridge for interfacing with a variety of user interface components 740 can be provided for interfacing with the chipset. Such user interface components 740 can include a keyboard, a microphone, touch detection and processing circuitry, a pointing device, such as a mouse, and so on. In general, inputs to system 700 can come from any of a variety of sources, machine generated and/or human generated.

The chipset can also interface with one or more communication interfaces 740 that can have different physical interfaces. Such communication interfaces 740 can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 710 analyzing data stored in storage. Further, the computer system 700 can receive inputs from the user interface components 740 and execute appropriate functions, such as browsing functions by interpreting these inputs using processor 710.

It can be appreciated that example computer system 700 can have more than one processor 710 or be part of a group or cluster of computing devices networked together to provide greater processing capability. The computer system 700 includes a ROM 720 and the storage device 730 includes MOD 1 732, MOD 2, 734, and MOD 3 736.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The invention claimed is:

1. A method comprising:
   establishing a secure transport layer tunnel over a public network between a first cloud gateway in a private cloud and a second cloud gateway in a public cloud, the secure transport layer tunnel configured to provide a link layer network extension between the private cloud and the public cloud;
   detecting whether a router in the public cloud is present and functioning;
   intercepting, via a switch in the public cloud, a first address resolution protocol (ARP) request sent from a virtual machine in the public cloud, the switch configured to intercept at least a portion of all ARP requests forwarded through the switch to resolve a media access control (MAC) address of a given default gateway IP address, the portion of the ARP requests including the first ARP request;
   when the router is detected to be present and functioning, fabricating, via the switch, a first ARP response including a MAC address of the router, and sending, via the switch, the first ARP response to the virtual machine; and
   when the router is not detected to be present or is detected to be present and malfunctioning, returning a private router address.

2. The method of claim 1, wherein the first ARP request sent from the virtual machine in the public cloud is for a router MAC address.

3. The method of claim 2, wherein the router is an fabric router.

4. The method of claim 1, further comprising:
   migrating the virtual machine from the public cloud to the private cloud;
   receiving a second ARP request sent from another virtual machine in the private cloud at the first cloud gateway in the private cloud; and
   fabricating by the first cloud gateway a second ARP response including a MAC address of another router in the private cloud.

5. The method of claim 1, further comprising:
   detecting a malfunction of the router;
   receiving a second ARP request sent from another virtual machine in the private cloud; and
   in response to detecting the router has malfunctioned, fabricating a second ARP response including another MAC address of another router in the private cloud.

6. The method of claim 1, wherein the switch is configured to load balance by intercepting only the portion of the ARP requests.

7. A non-transitory computer-readable medium having computer readable instructions stored on the non-transitory computer-readable medium that, when executed are effective to cause a computer to:
   establish a tunnel over a public network between a public cloud and a private cloud to provide a link layer network extension between the public cloud and the private cloud;
   detect whether a router in the public cloud is present and functioning;
   intercept, via a switch on the public cloud, an address resolution protocol (ARP) request sent from a virtual machine in the public cloud, the switch configured to intercept at least a portion of any ARP requests to resolve a media access control (MAC) address of a given default gateway IP address, the portion of the ARP requests including the ARP request, the ARP requests forwarded through the switch;
   when the router is present and detected to be functioning, fabricate, via the switch, an ARP response including a MAC address of the router and return, via the switch, the MAC address of the router; and
   when the router is not detected to be present or is detected to be present and malfunctioning, return a private router address.

8. The non-transitory computer-readable medium of claim 7, wherein the instructions are effective to send a gratuitous ARP message to the virtual machine with the private router address when the router is not present or detected to be malfunctioning.

9. The non-transitory computer-readable medium of claim 7, wherein after the virtual machine in the public cloud has been migrated to the private cloud, instructions are effective to return the private router address.

10. A system comprising:
    a processor;
    a first cloud gateway in a first cloud;
    a second cloud gateway in a second cloud;
    a secure transport layer tunnel over a public network between the first cloud gateway in the first cloud and the second cloud gateway in the second cloud, the secure transport layer tunnel configured to provide a link layer network extension between the first cloud and the second cloud;

a private application virtual machine in the second cloud connected to the second cloud gateway configured to switch inter-virtual machine traffic between the second cloud and the private application virtual machine;

a default gateway extension in the second cloud configured to intercept an address resolution protocol (ARP) request for resolving a default gateway media access control (MAC) address sent from the private application virtual machine, the default gateway extension configured to intercept at least a portion of all ARP requests forwarded through the default gateway extension to resolve an address of the default gateway MAC address, the portion of the ARP requests including the ARP request, the ARP requests forwarded through the default gateway extension, wherein, the default gateway extension is configured to detect whether a router on the second cloud is present and functioning, when the router is detected to be present and functioning, the default gateway extension is configured to fabricate an ARP response including a MAC address of the router and return the ARP response to the private application virtual machine, and when the router is not detected to be present or is detected to be present and malfunctioning, the default gateway extension is configured to return a private router address.

11. The system of claim 10, wherein the first cloud is a private cloud and the second cloud is a public cloud.

12. The system of claim 11, further comprising:
a virtual supervisor module in the private cloud configured to manage the private application virtual machine in the public cloud as though the private application virtual machine was within the private cloud.

13. The system of claim 11, further comprising:
a virtual supervisor module in the private cloud configured to enable the default gateway extension in the public cloud.

14. The system of claim 11, wherein the default gateway extension is configured to send a gratuitous ARP message to the private application virtual machine with the private router address when the router is not present or detected to be malfunctioning.

15. The system of claim 11, wherein the default gateway extension and the second cloud gateway are part of a fabric switch.

16. The system of claim 10, further comprising:
a default gateway extension module having a configuration web page.

17. The system of claim 16, wherein the configuration web page includes a plurality of IP address forms and an enterprise router selection.

* * * * *